Figure 1:
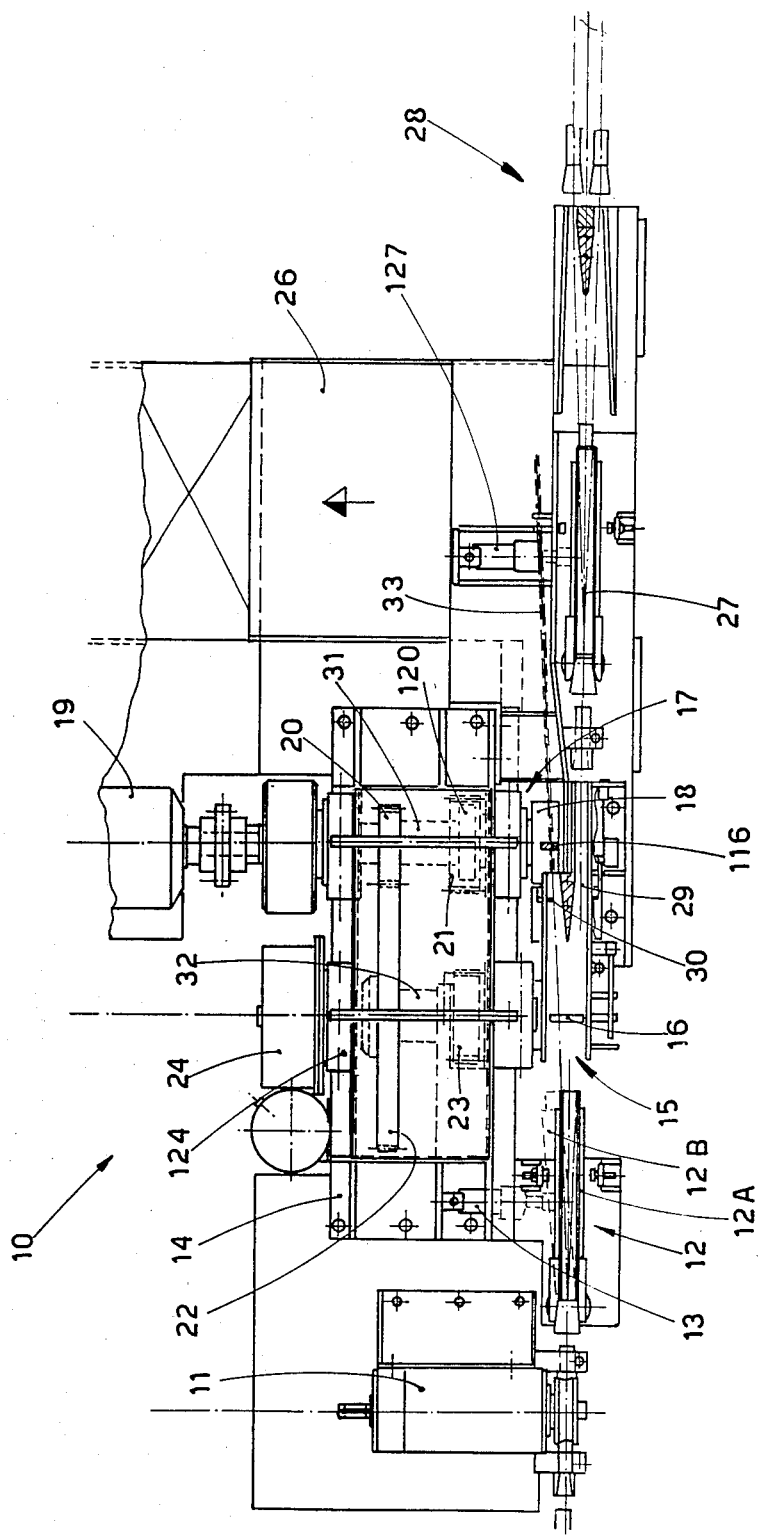

United States Patent [19]

Fuccaro

[11] Patent Number: 4,627,320

[45] Date of Patent: Dec. 9, 1986

[54] COMPACT SHEARING MACHINE WITH SCRAP SHEARS

[75] Inventor: Giorgio Fuccaro, Udine, Italy

[73] Assignee: Danieli & C. Officine Meccaniche S.p.A., Italy

[21] Appl. No.: 694,078

[22] Filed: Jan. 23, 1985

[30] Foreign Application Priority Data

Jan. 27, 1984 [IT] Italy ............................ 83311 A/84

[51] Int. Cl.$^4$ ................................ B23D 5/12
[52] U.S. Cl. .................................. 83/163; 83/288; 83/303; 83/306; 83/923
[58] Field of Search ............... 83/303, 306, 307, 404, 83/923, 288, 163

[56] References Cited

U.S. PATENT DOCUMENTS

| | | | |
|---|---|---|---|
| 2,670,796 | 3/1954 | Orr | 83/303 |
| 2,984,137 | 5/1961 | Wilson | 83/303 |
| 3,109,340 | 11/1963 | Kinnicutt, Jr. | 83/105 |
| 3,258,951 | 7/1966 | Kinnicutt, Jr. | 83/105 |
| 3,834,260 | 9/1974 | Sieurin | 83/303 X |
| 4,062,259 | 12/1977 | Sclippa | 83/303 X |

FOREIGN PATENT DOCUMENTS

| | | |
|---|---|---|
| 688185 | 2/1940 | Fed. Rep. of Germany . |
| 724636 | 9/1942 | Fed. Rep. of Germany . |
| 1125259 | 11/1956 | Fed. Rep. of Germany . |
| 2720136 | 11/1978 | Fed. Rep. of Germany . |
| 1355123 | 2/1964 | France . |
| 2134897 | 12/1972 | France . |
| 472797 | 9/1937 | United Kingdom . |

Primary Examiner—James M. Meister
Attorney, Agent, or Firm—Wegner & Bretschneider

[57] ABSTRACT

Compact shearing machine (10) with scrap shears which comprises a shears means (15) that cuts to size, a scrap shears means (17), a deviator means (12) to deviate rolled products (33) and a motor means (19), the scrap shears means (17) being positioned immediately downstream from the shears means (15) that cuts to size, in the direction of sliding of the rolled products (33).

14 Claims, 4 Drawing Figures

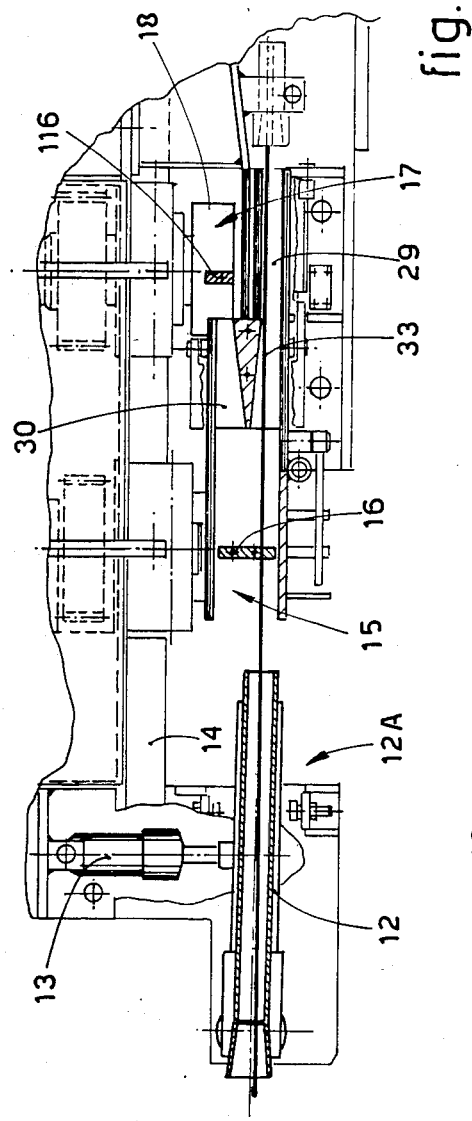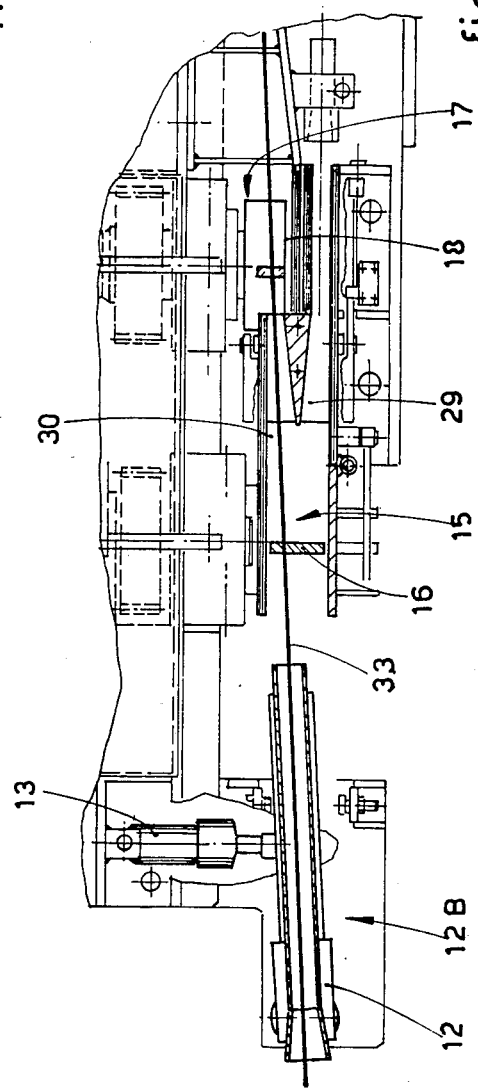

COMPACT SHEARING MACHINE WITH SCRAP SHEARS

This invention concerns a compact shearing machine with scrap shears. To be more exact, the invention concerns a shearing machine of a flying shears type which includes a scrap shears downstream from a main shears that cuts to size, within one single framework.

According to the invention the shears that cuts to size and the scrap shears are driven by only one motor means through a suitable transmission.

A deviator means is also provided which can switch the segment of bar to be sheared either towards a collection channel or towards a scrap channel by which the crop ends to be scrapped are sent to a collection bin.

Various embodiments exist in the known art which comprise a station for scrap downstream of a flying shears. Such embodiments are generally concerned with the trimming of strips and the shredding of scrap.

For instance, Pat. DE No. 688,185 discloses an oscillatably suspended shredder located downstream of a circular-bladed trimming shears suitable to trim strips laterally.

Pat. DE No. 724,636 discloses a shears to trim strips.

Pat. DE-OS No. 2,720,136 discloses a flying shears downstream of which is located a deviator system with movable tubes to send rolled products to a scrap shears. The assemblage is not very compact and the two shears have separate actuation systems.

Pat. DE-AS No. 1,125,259 discloses a shredder shears with a pneumatic guide for scrap material, the shears being positioned downstream of a circular-bladed shears that trims strips.

Pat. FR No. 1,355,123 discloses a flying shears of which the rotors, while rotating, can be brought alongside each other for shearing. Selection of the shearing times determines the lengths sheared.

Pat. FR No. 2,134,897 describes a trimming machine for strips, with a scrap shears located downstream.

Pat. GB No. 472,797 discloses a like embodiment but includes a deviator for scrap and a shears having an oscillating motion.

Methods of shearing rolled bars to size are known. Plants commonly employed for this purpose normally have a scrap shears positioned upstream from the shears that cuts to size.

Switch means, which generally consist of a pivoted vane actuated hydraulically and located upstream from the scrap shears, perform deviation of the rolled product to a scrap line when such scrap shears is working.

Instead, when, for instance, the head or tail of the rolled products is not being sheared for scrap, such switch is positioned in such a way as to let the bar continue along the conveyor line to the shears which cuts to size and which then shears the various billets to the required length.

It is known that the head and tail of the bar may have various types of defects that make such bar and tail unacceptable for the successive processes. it is therefore necessary to crop the head or tail, as required, of the rolled product arriving.

So as to crop the head, the first segment of the bar is deviated in correspondence with the scrap shears and is cut by the latter into a series of small crop ends which are discharged.

When the necessary length of head of the bar has been sheared, the switch is then returned to its normal position and the remainder of the bar is sent on to be cut to size.

An analogous method is employed to shear the tail; the tail of the bar is deviated by such switch means so as to arrive below the scrap shear blades, which shear the tail and send the various crop ends thus obtained to the collection bin, whereas the remainder of the bar proceeds so as to be cut to size.

These known embodiments provide for the use of a hydraulic switch to deviate the head or tail to be sheared for scrap.

Since the scrap shear blades are capable of continuous rotation, it is necessary to synchronize the actuation of the switch and the rotation of such blades, the position of which has to be known moment by moment.

Synchronization means, such as electronic means for instance, are therefore needed to synchronize the switch and the continuously rotating blades.

Such synchronization means take into account any lag in the actuation by the hydraulic actuator that controls the movement of the switch.

Such type of control is not only complex and expensive but also leads to problems of timing, adjustment, setting up, maintenance, etc.

Other known embodiments have disk shears, which perform an oblique cut on the rolled bars which is not always acceptable.

Moreover, the known plants are rather bulky since they need to accommodate separate shears for the scrap and for cutting to size besides the necessary drawing units, and such a layout entails heavy cost of installation, shielding and operation.

It is therefore a purpose of this invention to simplify the embodiment of a shearing machine that cuts off the head and tail for scrap and cuts the bar to size, and also to reduce the overall bulk of the whole unit cutting to size and cutting for scrap considerably.

According to the invention the scrap shears is positioned downstream from the shears that cuts to size. The actual switching of the bar, therefore, takes place downstream from the shears that cuts to size.

The bar can go in one of two directions downstream from the shears that cuts to size, depending on the inclination of a deviator channel located upstream from the same shears.

In the first of such directions the bar is cut to size by the shears which performs such operation, and the segments thus sheared are sent on to one or more collection channels.

In the other position of the deviator channel immediately upstream from the shears that cuts to size, the bar passes just the same between the shear blades, but its inclination is such that it is deviated against an appropriate deviation wall located immediately downstream from the shears that cuts to size.

In this way, after having been cut to size by that shears, the bar is sent forward to the scrap shears located immediately downstream.

The crop ends thus cut from the segment of bar sent to the scrap shears are discharged to a collection bin.

The invention provides for the deviation of the bar to be controlled by means of a monitoring action performed upstream from the position of the tail of the bar.

According to the invention the switch means can be operated by actuator means of a pneumatic type. In this way it is possible to obviate the employment of a hydraulic actuator unit, which is very complicated besides being costly.

As a variant the invention envisages the use of a hydraulic actuator only where, for reasons which will be made clear later, it is desired to cut for scrap a particularly short length of the head of the bar.

According to the invention the shearing for scrap is made independent of the deviation applied to the bar.

An electronic synchronization control is therefore unnecessary since there is no longer any need for perfect synchronization of the deviation with the shearing of scrap.

As stated earlier, the invention provides only one motor to drive the shears that cuts to size and the scrap shears. Moreover, the invention obtains a great compactness of the whole assemblage, which has a considerably reduced overall bulk, a low weight and a simplified construction and is therefore less expensive than the known embodiments. Furthermore, maintenance of the whole unit is simplified.

The present invention is therefore embodied with a compact shearing machine with scrap shears, such machine comprising a shears means that cuts to size, a scrap shears means, a deviator means to deviate rolled products, and a motor means, the scrap shears means being positioned immediately downstream from the shears means that cuts to size, in the direction of sliding of the rolled products.

Figure 2:
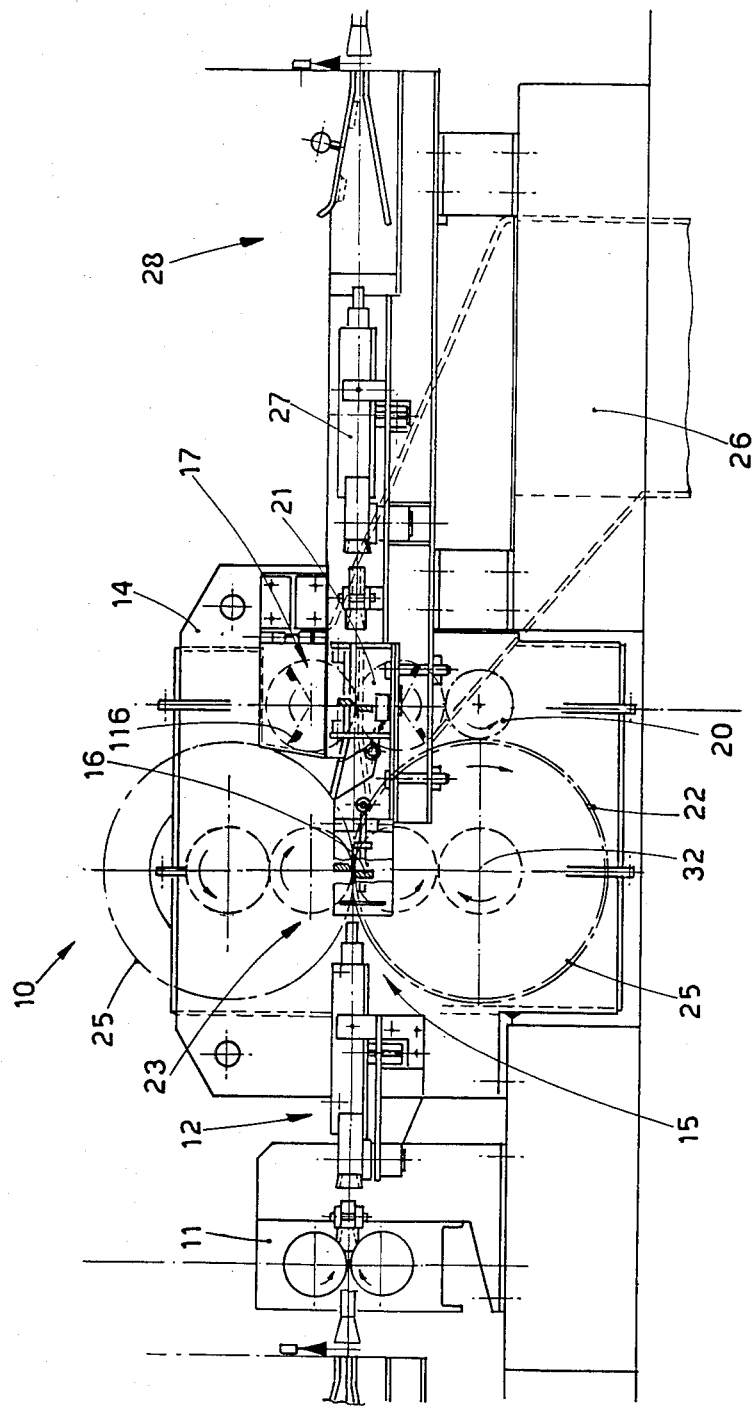

We shall describe hereinafter, as a non-restrictive example, a preferred embodiment of the invention with the help of the attached figures, in which:

FIG. 1 gives a partly cutaway plan view of a compact shearing machine according to the invention;

FIG. 2 gives a side elevation of the machine of FIG. 1;

FIGS. 3 and 4 show the method of working of the shearing machine.

In the figures a shearing machine 10 with a scrap shears comprises, immediately upstream, a drawing unit 11 of a known type which employs rollers to draw the rolled product.

The direction of sliding of the rolled product is from left to right in the figures.

A frame 14 bears the various means which constitute a shears 15 that cuts to size and a scrap shears 17.

Such frame 14 bears also a deviator means 12 which is positioned immediately upstream from the rotor of the shears 15 that cuts to size, of which a blade 16 can be seen in FIG. 1.

Such deviator means 12 consists, in this example, of a tubular channel which can be displaced by an actuator 13. In the figure the actuator 13 is a pneumatic jack.

Depending on the usage conditions, the deviator 12 sends bars into a channel 29 located immediately downstream from the blade 16 or else into a channel 30 that leads to the scrap shears 17, of which a rotor 18 and blade 116 to cut for scrap can be seen.

One single motor 19 drives both the shears 15 and 17 and sends motion to a shaft 31 to which is keyed a pinion 20 that transmits motion to a crown wheel 22.

The crown wheel 22 in its turn is solidly fixed to a cup 124 of a brake-clutch unit 24 located in the rear part of the frame 14.

The brake-clutch unit 24 actuates, through a shaft 32, a series of transmission pinions 23 coaxially with the crown wheel 22.

FIG. 2 shows trajectories 25 of the blades 16.

The motion-input shaft 31 actuates, by means of a gear wheel 120, a pair of pinions 21, which in turn actuate the rotors 18 of the scrap shears 17 to which there is fitted a variable number of blades 116, in this example three blades per rotor 18.

In any event the number of such blades 116 will be selected in relation to the speed of rotation pre-set for the scrap shears and also to the length of the single crop ends which it is necessary to obtain.

As can be seen from the reduction ratios applied to the train of gears shown, the speed of rotation of the shears 15 that cuts to size is slower than that of the scrap shears 17.

This prevents any jamming of material in the gap between the two shears 15-17 since the scrap shears 17 exerts a drawing effect, which removes the crop ends from the shearing zone without any possibility of jamming.

With particular reference to FIGS. 3 and 4 the method of working is as follows.

A rolled bar 33 is normally sent to a channel 29 and sheared to size by the blade 16.

Whenever the tail of the bar 33 is to be sheared, the deviator 12 is moved to position 12B (see FIG. 4). In this way the bar 33 is deviated sideways and, when its tail is sheared by the blades 16, the front end of such tail enters the channel 30 and thus reaches the scrap-shearing zone.

The blades 116 of the scrap shears 17 shear such tail into a series of crop ends, which are collected in a scrap bin 26 (FIG. 1) and then discharged in a known manner.

If the head of the bar 33 is to be sheared, the deviator 12 is pre-set in position 12B, and in this way when the head of the rolled bar 33 arrives, it is directed at once to the channel 30 and thus to the scrap shears 17. The crop ends are discharged into the bin 26 as detailed above.

When the head of the bar 33 has been cropped by the blade 16 upstream from the scrap shears at 17, the deviator 12 is brought back to position 12A. In this way the front end of the bar 33 passes into the channel 29 and the bar is cut to size by the shear blade 16.

In a variant where a particularly short length of cropped head is required, an actuator 13 of a hydraulic type instead of a pneumatic type can be employed. Such hydraulic actuator serves to obtain synchronization of the sideways deviation of the bar 33 with the shearing of the head by the blades 16.

The purpose of this is to reduce the length of the portion cropped for scrap and to leave integral the greatest possible length of bar 33, and to obtain this the bar 33 must be deviated sideways simultaneously with the shearing of the same by the shears 15.

The deviator 27 shown downstream from the channel 29 (FIGS. 1 and 2) has only the purpose of sending a bar 33 sheared to size within one or the other of collection channels 28 shown.

It is possible to provide only one of such collection channels 28 or more than one.

I claim:

1. A compact shearing machine containing scrap shears, said machine comprising
a shears means for cutting objects to size,
a scrap shears means,
motor means to actuate at least said scrap shears means,
a scrap shearing channel located downstream of said shears means and leading to said scrap shears means,
a shearing-to-size channel located downstream of said scrap shears means and leading to at least one collection channel, said scrap shearing channel and said shearing-to-size channel being positioned substantially in parallel, said scrap shears means located in a position offset from said shears means for cutting objects to size, and means for directing the objects to be cut to either said scrap shearing channel or said shearing-to-size channel, said means for directing located upstream of said shears means.

2. The compact shearing machine of claim 1, further comprising a frame, on to which said scrap shears means and said shears means for cutting objects to size are fitted.

3. The compact shearing machine of claim 1, wherein said motor means at least indirectly actuates both said shears means for cutting objects to size and said scrap shears means.

4. The compact shearing machine of claim 2, wherein said motor means at least indirectly actuates both said shears means for cutting objects to size and said scrap shears means.

5. The compact shearing machine of claim 2, wherein said frame also contains said means for directing.

6. The compact shearing machine of claim 4, wherein said frame also contains said means for directing.

7. The compact shearing machine of claim 1, where for any position of said means for directing, the object to be cut has a transverse position within the profile of the blades of said shears means for cutting objects to size.

8. The compact shearing machine of claim 2, wherein for any position of said means for directing, the object to be cut has a transverse position within the profile of the blades of said shears means for cutting objects to size.

9. The compact shearing machine of claim 3, wherein for any position of said means for directing, the object to be cut has a transverse position within the profile of the blades of said shears means for cutting objects to size.

10. The compact shearing machine of claim 4, wherein for any position of said means for directing, the object to be cut has a transverse position within the profile of the blades of said shears means for cutting objects to size.

11. The compact shearing machine of claim 5, wherein for any position of said means for directing, the object to be cut has a transverse position within the profile of the blades of said shears means for cutting objects to size.

12. The compact shearing machine of claim 6, wherein for any position of said means for directing, the object to be cut has a transverse position within the profile of the blades of said shears means for cutting objects to size.

13. The compact shearing machine of claim 1, wherein said means for directing is actuated pneumatically.

14. The compact shearing machine of claim 1, wherein said means for directing is actuated hydraulically.

* * * * *